United States Patent Office 2,874,575
Patented Feb. 24, 1959

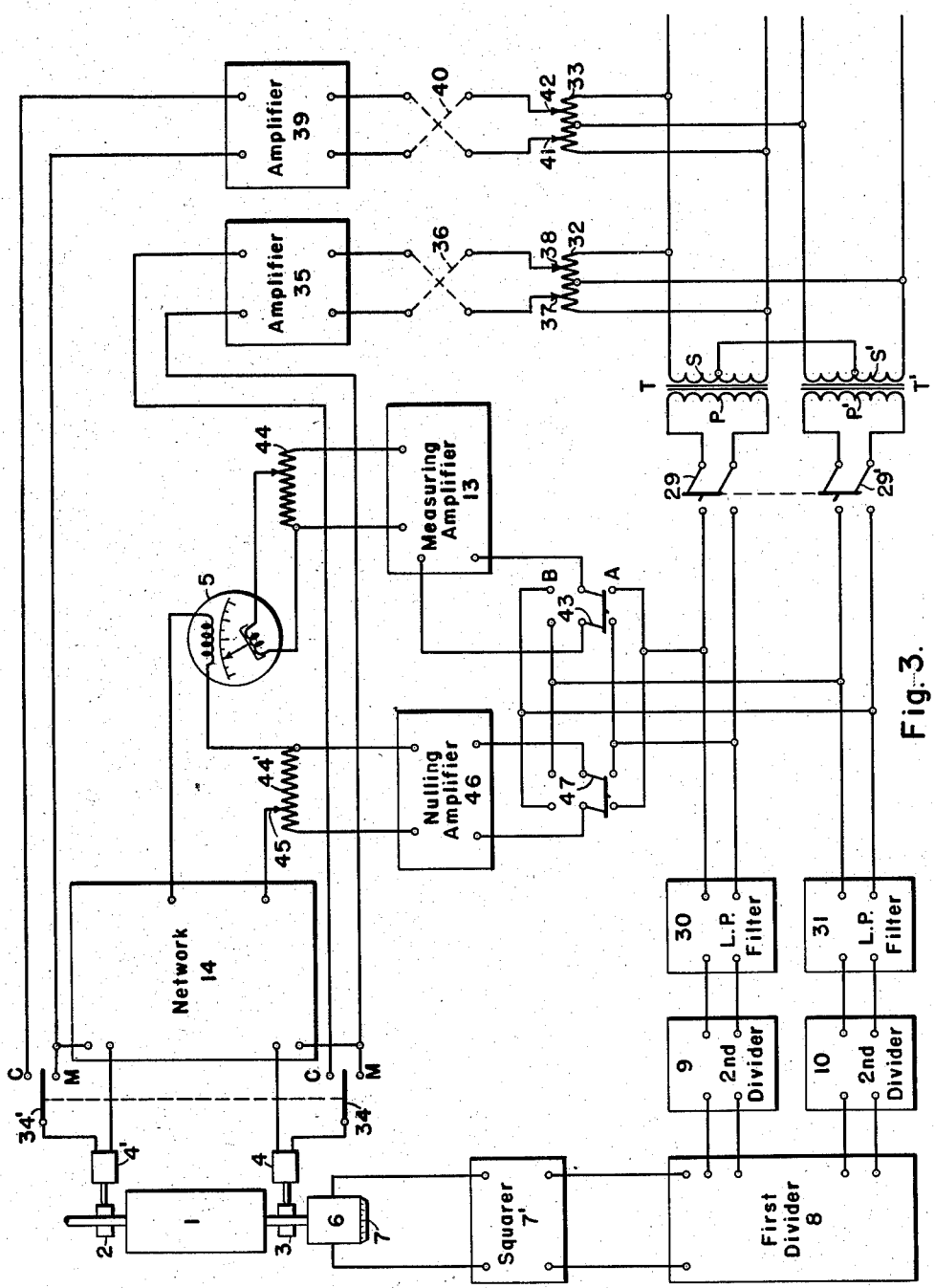

2,874,575
BALANCING MACHINE

Sheldon I. Rambo, Baltimore, Md., assignor to Westinghouse Electric Corporation, East Pittsburgh, Pa., a corporation of Pennsylvania Application July 20, 1953, Serial No. 368,949

4 Claims. (Cl. 73—463)

This invention relates to machines for balancing rotating masses and more particularly to electrical balancing machines for determining the magnitude and position of the unbalance in rotating masses.

One of the simplest and most accurate means of detecting the unbalance in rotating masses is the "wattmeter" system. The "wattmeter" system as utilized in some prior art balancing equipment utilizes a special two-phase permanent magnet type generator of a size which falls well outside the range of standard permanent magnet generators, or resort must be had to another type generator such as a photocell generator. If a photocell generator is used in one of the prior art balancing systems, it must necessarily have two completely separate photocell heads to develop the required two-phase power. The use of either the permanent magnet or the photocell generator has disadvantages which make the balancing systems more expensive than they would be if a smaller single phase generator could be used. The disadvantages accompanying the use of a special generator are even more apparent when a balancing system of the type which has nulling, compensating, and measuring features, such as is shown and described in the J. G. Baker Patent 2,315,578, entitled Apparatus for Balancing, and issued April 6, 1943, is used.

Accordingly, it is a main object of this invention to provide a system for determining the unbalance of a rotating mass which utilizes a single phase generator which is smaller than similar generators heretofore in use.

Another object of this invention is to provide a system for determining the unbalance of a rotating mass which utilizes a standard single phase generator, which is smaller than non-standard generally similar generators used heretofore.

A specific object of this invention is to provide an unbalance determining system of the "wattmeter" type which utilizes a small standard single phase generator for energizing the wattmeter current coil.

Another specific object of this invention is to provide an unbalance determining system which utilizes a small single phase generator to furnish signals for measuring, compensating, and nulling purposes.

The objects stated are merely illustrative. Other objects and advantages will be more apparent from a study of the accompanying specification and drawings, in which:

Fig. 3 shows a diagrammatic view of yet another embodiment of the invention.

Figure 1:
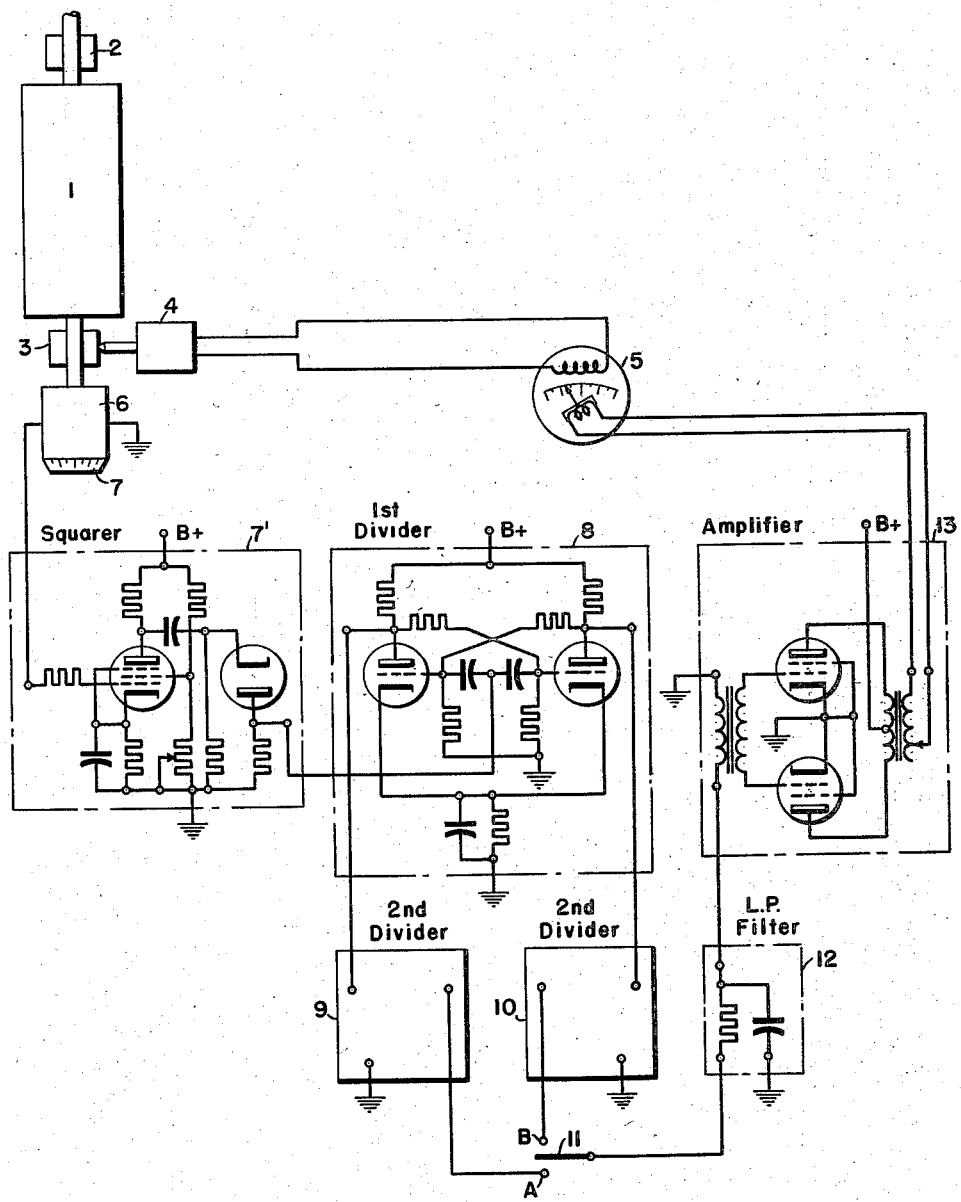
Figure 1 shows a diagrammatic view of one embodiment of the invention.

In Fig. 1, the test piece or rotating mass is indicated by the numeral 1. The ends of the rotating mass 1 are disposed in bearings 2 and 3. The balancing system shown in Fig. 1 is intended as a field balancing system and therefore the bearings 2 and 3 represent the bearings in which the rotor operates. Any unbalance of the rotating mass will cause vibrations and a pickup 4 is utilized to generate a voltage which is indicative of the vibrations of the rotating mass. The output voltage from the pickup 4 is applied to the voltage coil of an indicating instrument 5 which is shown as being of the wattmeter type.

Present field balancing systems of the wattmeter type utilize only one pickup placed at one bearing and determine the amplitude of the vibration at the bearing due to unbalance and determine the angle of unbalance. The pickup is then changed to the other bearing and the angle and magnitude of the vibration of the rotor at that bearing determined. With these readings the magnitude and location of the unbalance in the correction planes of the rotor may be calculated and thus the proper amount of material may be removed from the proper position or positions to balance the rotor. The generator for the system just described must be two phase and in addition, since a stage of amplification is generally not applied between the generator and the wattmeter current coils, it must be larger than standard permanent magnet generators available on the market. The generator usually has an output of rotational frequency so that only voltages from the pickup which are of running frequency will be indicated on the wattmeter and the voltages caused by the unbalance are inherently of running frequency.

The generator 6 of the system illustrated in Fig. 1 is intended to be a standard small permanent magnet eight pole generator, possibly of the tachometer type, with the stator windings so wound that the generator has a single phase voltage output. The stator of the generator may be rotated to permit shifting the phase of the voltage supplied by the generator and a protractor 7 is provided to indicate the angle of rotation of the stator. The single phase voltage of the generator 6 is applied to a common squarer circuit 7' which may be of any number of well-known types, one of which is shown. The output of the generator 6 is squared for proper divider operation and then applied to a first divider circuit 8 which is shown for convenience as being of the well-known Eccles-Jordan flip-flop variety which develops two square-wave output voltages displaced 180° from each other and having half the frequency of the input voltage. One of these output voltages is applied to a second divider 9 and the other is applied to a second divider 10. Again the frequency of these two voltages is halved and hence these output voltages will be 90° out of phase with each other since their input voltages at double frequency were 180° out of phase. Thus two square voltage waves in quadrature at rotational frequency are obtained or effectively a two-phase voltage supply is provided. A simple single-pole double-throw switch 11 selects which phase of the two-phase voltage will be connected to the current coil of the indicating instrument 5 through a low-pass filter 12 and an amplifier 13. The low-pass filter 12 is used to restore the voltage to a more nearly sinusoidal shape and the amplifier 13 is utilized to insure that the signal from the relatively small generator 6 will be large enough for the indicating instrument 5.

One position of the single-pole double-throw switch 11 is used for measuring or determining the angle of the unbalance and the other position is used to determine the magnitude of the unbalance. That is, when the switch is in position B the output of the second divider 10 is applied to the current coil of the wattmeter 5 through the low-pass filter 12 and the amplifier 13. The phase angle of the voltage from the generator 6 to the squarer 7' is shifted until the wattmeter is nulled. Thus, the voltage applied to the wattmeter current coil from the generator 6 is 90° out of phase with the voltage from the pickup 4 and the angle of unbalance with respect to the reference on the rotor to be balanced is indicated on the phase shifter, in this case the protractor 7, which indicates the rotation of the stator of the generator 6. When the wattmeter has been nulled, the single-pole double-throw switch is simply moved to position A and the wattmeter will give maximum indication for the position of the pickup 4 and this will represent the magnitude of unbalance.

Figure 2:
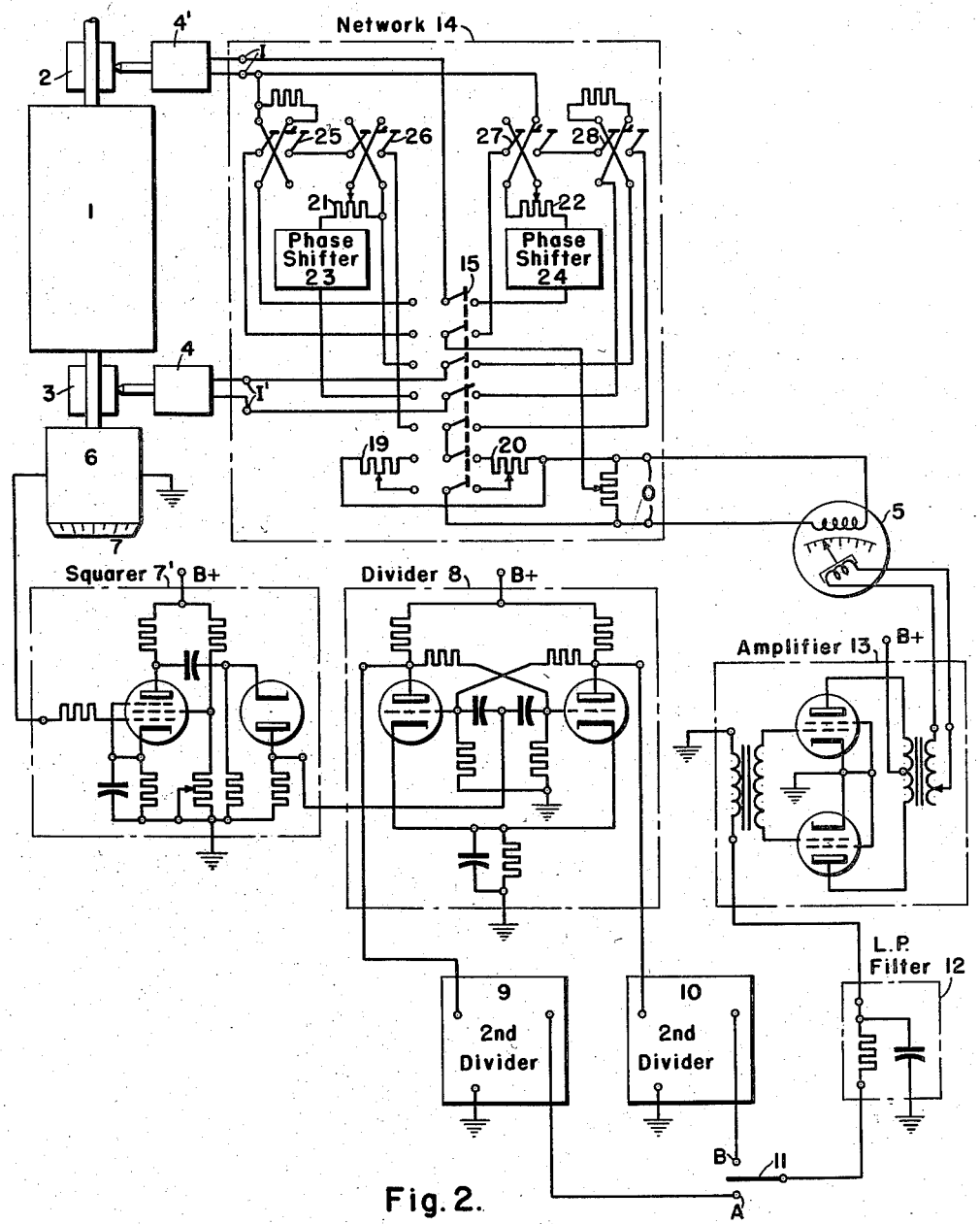
Fig. 2 shows diagrammatically another embodiment of the invention.

The circuit of Fig. 2 shows a system which is designed primarily for indicating unbalance of rotors in mass production where the rotors may be supported on a balancing machine. The system of Fig. 2 utilizes many of the same components utilized in Fig. 1 and the corresponding components will be given corresponding numbers.

The rotating mass 1 is seismically mounted in the bearings 2 and 3 and pickups 4 and 4' are provided to generate voltages which represent the displacement of the rotor 1 due to an unbalance when the rotor is rotating. Again a small permanent magnet generator 6 is provided to generate a voltage at four times the rotational frequency of the rotating mass 1. The generator also has a rotatable stator mounted in a protractor 7 which will indicate the angle of rotation as previously described. Just as described for the circuit of Fig. 1 the current coil of an indicating instrument 5 of the wattmeter type is supplied from the generator 6 through a squarer 7', a first divider 8 and selectively from second dividers 9 and 10 through a low-pass filter 12 and amplifier 13. Again a single-pole double-throw switch 11 is provided to select the second divider which will supply the current coil of the wattmeter 5.

The voltage coil of the wattmeter 5 is supplied with a voltage from the pickups 4 and 4' as determined by a network 14. The network 14 is provided to oppose a part of the voltage output from the pickup 4 against the output voltage of the pickup 4' in such a way as to give a voltage output from the network 14 which is proportional only to the unbalance in an arbitrarily chosen correction plane nearest the pickup 4' when the reversing switch 15 is in its right-hand position. When the reversing switch 15 is in its left-hand position, the network will oppose a portion of the voltage generated in the pickup 4' against the voltage generated in pickup 4 in such a way to give a network output voltage which is proportional only to the unbalance in an arbitrarily chosen correction plane nearest the pickup 4. It may be necessary to insert an amplifier between the network 14 and the potential coil of wattmeter 5 to develop sufficient power for the wattmeter in some cases.

The network 14 has input terminals I and I' adapted to receive the voltages from the pickups 4' and 4, respectively, and output terminals 0. The network 14 contains potentiometers 19, 20, 21 and 22 for determining the magnitudes of the voltages from the pickups 4 and 4' which will be matched against each other for determining the unbalance in a given arbitrarily chosen correction plane. The phase shifters 23 and 24, the reversing switches 25, 26, 27 and 28 are for determining the phase of the voltages from the pickups 4 and 4' which are matched against each other so that the voltage appearing across the output terminals 0 of the network 14 will represent the unbalance voltage in the arbitrarily chosen correction plane both in phase and magnitude.

For a complete discussion of the network circuits and the method of calibrating the network, reference may be had to Patent 2,165,024 issued to John G. Baker and Frank C. Rushing on July 4, 1939 assigned to the same assignee and entitled Indicating Balancing Machine.

When the single-pole double-throw switch 11 is in position B the current coil of the indicating instrument 5 is supplied with the voltage from the divider 10 and if at the same time the reversing switch 15 of the network 14 is in the right-hand position, the voltage coil of the indicating instrument 5 will receive a signal from the network 14 which is proportional only to the unbalance in the arbitrarily chosen correction plane nearest the pickup 4'. The phase of the output voltage of generator 6 is shifted until the wattmeter 5 is nulled and thus the angle of unbalance in the arbitrarily chosen correction plane is indicated on the protractor 7 which indicates the angle of rotation of the stator. The single-pole double-throw switch 11 is then changed to position A and the magnitude of unbalance in the arbitrarily chosen correction plane is determined. Next the reversing switch 15 of the network 14 is moved to the left-hand position and the voltage or the signal applied to the voltage coil of the indicating instrument 5 represents only the unbalance in the arbitrarily chosen correction plane nearest the pickup 4. Again the angle and amount measurements are taken in the same manner and thus the proper amount of material may be removed from the proper positions in the two arbitrarily chosen correction planes to balance the rotor. Notice that this system adapts itself to mass production of balanced rotors since no calculations are required to determine the amount and angle of unbalance of the rotating mass.

The invention is applied to the type balancing machines where not only the angle and amount of unbalance may be measured but nulling and compensating functions are also performed in Fig. 3. Notice that all of these functions are performed with the same simple generator previously described instead of a complex generator such as is used in present prior art systems of this type. Again many of the components of Figs. 1 and 2 are employed in Fig. 3 and these components are given corresponding numbers. The generator 6 with its protractor 7 and the two-phase voltage producing system is identical with those previously described. That is, a squarer 7', a first divider 8 and the two second dividers 9 and 10 are employed to produce a two-phase voltage as described. Again the numeral 1 represents the rotating mass and numerals 2 and 3 indicate the bearings for the rotating mass. The pickups 4' and 4 are identical to those utilized previously and a network 14 identical to that described for Fig. 2 is provided.

The system illustrated in Fig. 3 provides compensation to eliminate the need for calibrating and adjusting purposes of a perfectly balanced first rotor. The compensating feature provides individual voltages in series with each pickup so that any rotor may be placed in the machine and rotated at test speed and the voltage generated by the pickups may be opposed so that the net output from the pickups to an indicating instrument will be zero. Thus it appears to the indicating instrument that the rotor is perfectly balanced. Then by adding known weights in selected correction planes, the network 14 may be calibrated so that for one position of its reversing switch 15 the indicating instrument will indicate only the unbalance in the correction plane nearest one pickup and for the opposite position of the reversing switch 15 of the network 14 the indicating instrument will indicate only the unbalance in the correction plane nearest the opposite pickup. For a more detailed description of the compensating feature, reference may be had to Patent 2,315,578 issued to J. G. Baker on April 6, 1943, assigned to the same assignee and entitled Apparatus for Balancing.

Compensation is obtained in the embodiment of the invention shown in Fig. 3 by applying the voltages from the second dividers 9 and 10 through individual low-pass filters 30 and 31 to the primaries P and P' of transformers T and T' having secondaries S and S'. The transformers are connected in a two-phase to four-phase arrangement. A two-phase voltage from the four-phase secondaries S and S' is applied to a potentiometer 32 and the opposite two phases from the four phase transformer secondary connection is applied to the potentiometers 33. Ganged single-pole double-throw switches 34 and 34' are provided in the circuits of the pickups 4 and 4' so that when the switches are in the position C, pickup 4 is connected in a series circuit which contains the single-pole double-throw switch 34, the output of the compensating amplifier 35 and a part of the network 14. The pickup 4' is in a series circuit which contains the single-pole double-throw switch 34', the output of the compensating amplifier 39 and a part of the network 14 when the switch 34' is in the C position. The magnitude of the voltage supplied in the series circuit of the pickup 4 just recited is determined by the magnitude of the voltage between the taps 37 and 38 and amplification of the compensating amplifier 35. The phase angle of the voltage in series with the pickup 4 is determined by the position of the taps 37 and 38 and also the position of the reversing switch 36. Thus it may be seen that the voltage generated at the pickup 4 may be eliminated by a compensating voltage. A similar compensating voltage with the same adjustments may be supplied in series with the pickup 4' by means of potentiometers 33, the taps 41 and 42 on the potentiometers 33, the reversing switch 40 and the compensating amplifier 39. In this manner a perfectly balanced rotor is simulated and the network may be set up as previously described. The switches 29 and 29' are provided so that the transformers T and T' and thus the compensating components can be removed from the circuit.

Once the circuit has been compensated and the network 14 calibrated, then the single-pole double-throw switches 34 and 34' are moved to their M positions for measuring. The test weights are removed from the rotating mass 1 and the current coil of the indicating instrument 5 is connected to receive the output of divider 9 or divider 10 by the switch 43. In either case, the output of the divider passes through its low-pass filter, the switch 43, the measuring amplifier 13 to current coil of the indicating instrument 5. A potentiometer 44 is provided across the output of the measuring amplifier 13 to calibrate the voltage applied to the coil of the indicating instrument 5.

When the switch 43 is disposed in its B position and the phase voltage applied to the squarer 7' by the generator 6 is shifted by rotation of the stator until the indicating instrument is nulled then the angle of unbalance in the selected correction plane is determined as previously discussed. The switch 43 is then moved to its A position and the indicating instrument 5 will indicate the magnitude of unbalance in the correction plane selected as previously described.

A nulling feature is provided for the system since extraneous signals such as "noise" and "hash" may cause the indicator on the indicating instrument to oscillate and the indicating instrument reading to be somewhat erratic. The nulling feature simply provides a voltage in series with the voltage coil of the wattmeter 5 so that the voltage from the network 14 may be opposed and effectively eliminated to null the indicating instrument. Thus the magnitude of unbalance is read from the tap on the nulling potentiometer rather than from the instrument. The nulling in the present system simply provides a potentiometer 44' which has a tap 45 for varying the voltage in series about the voltage coil of the indicating instrument 5. The potentiometer 44' is supplied from a nulling amplifier 46 which has a reversing switch 47 which allows the nulling amplifier to be supplied by either the second divider 9 or the second divider 10.

It will be recognized that the objects of the invention have been achieved by providing balancing systems of various types which can use small standard permanent magnet-type generators in place of the complex generators now utilized in such prior art systems.

While in accordance with the patent statutes several best known embodiments of the invention have been illustrated and described in detail, it is understood that the invention is not limited thereto or thereby but that equivalents are clearly within the inventive scope.

I claim as my invention:

1. A system for determining the unbalance of a mass disposed to rotate in suitable bearings about a given axis of rotation, comprising, in combination, alternating current generating means coupled to said bearings for generating an unbalance signal at rotational frequency in accordance with the magnitude of unbalance of the rotating mass in a selected plane perpendicular to the axis of rotation of said rotating mass, means for generating a first square wave signal of at least twice rotational frequency, said latter means including an alternating current generator coupled to the rotating mass and a squarer circuit, dividing means connected to receive the output of said squarer circuit for dividing said first square wave into at least two square waves of rotational frequency and ninety degrees out of phase with each other, an indicating instrument adapted to receive a first and a second signal, said indicating instrument being connected to receive the unbalance signal, means for selectively energizing said indicating instrument with one of the latter said two square waves at the same time said instrument is receiving the unbalance signal, and means for varying the phase of said first square wave and said ninety degree out of phase square waves with respect to the rotating mass.

2. A system for determining the unbalance of a mass disposed to rotate in suitable bearings about a given axis of rotation, comprising, in combination, first alternating current generating means coupled to said bearings for generating an unbalance signal at a frequency that is a multiple of the rotational frequency of the mass in accordance with the magnitude of unbalance of the rotating mass in a selected plane perpendicular to the axis of rotation of the rotating mass, second alternating current generating means coupled to said rotating mass for generating a single phase alternating current voltage having a frequency that is a multiple of the rotational frequency of said mass, frequency dividing means connected to receive the output of said second alternating current generating means for obtaining two voltages 90° out of phase with each other from said single phase voltage and having the same frequency as the signal generated by said first alternating current generating means, phase shifting means for shifting the phase of said single phase voltage to thus simultaneously shift the phase of each of said 90° out of phase voltages, an indicating instrument having two actuating coils, with one of said coils being interconnected with the first generating means to thus be responsive to the unbalance signal, switching means, with the other of said coils being selectively interconnected by said switching means with either one of said two 90° out of phase voltages resulting from the second generating means.

3. A system for determining the unbalance of a mass disposed to rotate in suitable bearings about a given axis of rotation, comprising, in combination, first alternating current generating means coupled to said bearings for generating an unbalance signal at rotational frequency in accordance with the magnitude of unbalance of the rotating mass in a selected plane perpendicular to the axis of rotation of the rotating mass, second alternating current generating means operatively coupled to the rotating mass for generating a bias voltage having a frequency that is a multiple of the frequency of rotation of the rotating mass, squaring means for squaring said bias voltage to give a first square wave, frequency dividing means for dividing said first square wave into at least two square waves ninety degrees out of phase with each other and each having a frequency equal to the rotational frequency of the mass, an indicating instrument adapted to receive a first and a second signal, said indicating instrument being connected to receive the unbalance signal, means for selectively energizing said indicating instrument with one of said two square waves at the same time it receives the unbalance signal, and means for varying the phase relation of the square wave selectively energizing said instrument with respect to the unbalance signal.

4. A system for determining the unbalance of a mass disposed for rotation in suitable seismically mounted bearings, comprising, in combination, alternating current generating means coupled to the bearings for generating an unbalance voltage signal at the rotational frequency of said mass and in accordance with the magnitude of unbalance of the rotating mass in a selected plane perpendicular to the axis of rotation of said mass, means operatively coupled to the rotating mass for generating a bias voltage having a frequency of four times that of the rotational frequency of the rotating mass, means for squaring said bias voltage to give a first square wave voltage, dividing means for dividing said first square wave voltage into two square wave voltages at rotational frequency and ninety degrees out of phase with each other, an indicating instrument connected to simultaneously receive a first and a second signal, said indicating instrument being connected to receive the unbalance signal, and means for selectively energizing said indicating instrument at the same time with one of said two square waves, and means for varying the phase of said first square wave voltage and said two ninety degrees out of phase square wave voltages with respect to the rotation of said mass.

References Cited in the file of this patent

UNITED STATES PATENTS

| | | |
|---|---|---|
| 2,243,379 | Johnson | May 27, 1941 |
| 2,315,578 | Baker | Apr. 6, 1943 |
| 2,451,863 | Oakley | Oct. 19, 1948 |
| 2,534,918 | Kroft et al. | Dec. 19, 1950 |
| 2,731,834 | Fehr et al. | Jan. 24, 1956 |